(12) United States Patent
Shechterman

(10) Patent No.: US 6,624,956 B1
(45) Date of Patent: Sep. 23, 2003

(54) NUMERICAL APERTURE LIMITER

(75) Inventor: Mark Shechterman, Nes Ziona (IL)

(73) Assignee: Elop Electro-Optics Industries, Rehovot (IL)

( * ) Notice: Subject to any disclaimer, the term of this patent is extended or adjusted under 35 U.S.C. 154(b) by 0 days.

(21) Appl. No.: 09/689,821

(22) Filed: Oct. 13, 2000

(30) Foreign Application Priority Data

Oct. 14, 1999 (IL) .................................................. 132399

(51) Int. Cl.[7] .............................. G02B 5/04; G02B 7/18; G02B 13/10; G02B 13/16
(52) U.S. Cl. ...................... 359/831; 359/833; 359/837; 359/669; 359/671
(58) Field of Search ................................ 359/668, 669, 359/670, 671, 831, 833, 837

(56) References Cited

U.S. PATENT DOCUMENTS

| | | | | |
|---|---|---|---|---|
| 1,680,534 A | * | 8/1928 | Garbutt et al. |
| 3,497,289 A | * | 2/1970 | Oberheuser |
| 3,513,315 A | * | 5/1970 | Sundstrom et al. |
| 3,647,285 A | * | 3/1972 | Harvey et al. |
| 3,907,430 A | * | 9/1975 | Mann |
| 4,059,343 A | * | 11/1977 | Kowalski et al. |
| 4,405,203 A | * | 9/1983 | Wallner et al. |
| 4,407,464 A | * | 10/1983 | Linick |
| 4,453,087 A | * | 6/1984 | Linick |
| 4,808,823 A | * | 2/1989 | Moore et al. |
| 4,850,686 A | * | 7/1989 | Morimoto et al. |
| 5,201,895 A | * | 4/1993 | Grosso |
| 5,274,489 A | * | 12/1993 | Smith et al. |
| 5,461,513 A | * | 10/1995 | Maruyama |

FOREIGN PATENT DOCUMENTS

| | | |
|---|---|---|
| EP | 0 244 092 | 11/1987 |
| FR | 1156830 | * 5/1958 |
| GB | 472448 | 9/1937 |
| GB | 2187301 | * 9/1987 |
| IT | 0591743 | * 4/1959 |

* cited by examiner

Primary Examiner—Ricky D. Shafer
(74) Attorney, Agent, or Firm—Connolly Bove Lodge & Hutz LLP

(57) ABSTRACT

The invention provides a numerical aperture limiter for an optical thermal imaging system, comprising at least one pair of wedge-like prisms made of a transparent material having a known index of refraction, the prisms of the pair being disposed in close mutual proximity and in opposite orientation with the narrow end of one prism adjacent to the wide end of the other prism, the prism surfaces facing one another of the pair of prisms being spaced apart from one another by a distance at least equal to the wavelength of the light used by the imaging system, with the vertex angle of each one of the prisms being a function of the desired numerical aperture and the index of refraction.

3 Claims, 4 Drawing Sheets

NUMERICAL APERTURE LIMITER

FIELD OF THE INVENTION

The present invention relates to an optical thermal imaging system, and more particularly to a numerical aperture limiter for an optical thermal imaging system which uses light in the middle and far infra-red regions to produce an image on a detector surface for the purpose of thermal image acquisition.

BACKGROUND OF THE INVENTION

Devices incorporating thermal imaging systems are widely used for various civilian and military applications. These devices are highly sensitive to thermal noise, especially to the noise generated by radiation from the devices themselves. Reduction of noise generated by the detector is achieved by cooling down the detector to a low temperature.

Another method of reducing noise comprises the provision of a cold shield in front of the detector plane. The cold shield is a mechanical diaphragm which serves as the real pupil of the entire optical system. The cold shield communicates with the detector Dewar via a cylindrical tube having additional diaphragms, which causes the cold shield to assume the same temperature as the detector.

Only those rays from the object space that hit the entrance pupil (the re-imaged cold shield) and are within the field of view of the device as defined by the detector size and the effective focal plane of the optical system, will reach the detector. All rays which do not meet the above conditions will eventually hit the housing of the device or the cold shield itself, but will fail to reach the detector. The cold shield concept thus ensures the reduction of hot-ray noise arriving at the detector from the scene and improves the signal-to-noise ratio of the system.

However, apart from its advantages, the above-mentioned cold shield system suffers from several drawbacks relative to conventional thermal imaging systems without cold shields. First, the cold shield structure itself constitutes a large, additional mass to be cooled, causing the cooler to consume more power than the conventional thermal system. Then, the optical system is much more complex, requiring an additional optical relay system to re-image the cold shield of the detector into the entrance pupil of the system. Also, owing to the close proximity of the cold shield and the detector plane, the F-number (F/#) rapidly increases with the angle of the field of view. Last, but not least, the change of the angle of incidence of the rays with the field of view causes additional degradation of transmission through the interference cold filter, which is usually designed for some discrete optimal angle.

SUMMARY OF THE INVENTION

It is thus one of the objects of the present invention to provide a numerical aperture limiter (NAL) which is based on the principle of total internal reflection (TIR) and will transmit to the detector plane only those rays the angle of incidence of which does not exceed the numerical aperture of the selected system.

It is another object of the present invention to provide an NAL which need not be located in the evacuated and cooled internal space of the detector, but which can be attached to the outside of the detector window, thereby saving the energy wasted in cooling the cold shield structure of prior-art systems.

It is yet another object of the present invention to provide a graded series of NALs, attachable to the outside of a detector window, so that one and the same detector-Dewar-cooler unit can be used for various optical thermal systems by simply selecting the appropriate NAL for that series.

It is still another object of the present invention to provide an NAL that can be used with an optical thermal system without the need for an optical relay.

In accordance with the present invention, there is therefore provided a numerical aperture limiter for an optical thermal imaging system, comprising at least one pair of wedge-like prisms made of a transparent material having a known index of refraction, the prisms of said pair being disposed in close mutual proximity and in opposite orientation with the narrow end of one prism adjacent to the wide end of the other prism, the prism surfaces facing one another of said pair of prisms being spaced apart from one another by a distance at least equal to the wavelength of the light used by said imaging system, with the vertex angle of each one of said prisms being a function of the desired numerical aperture and said index of refraction.

The invention further provides a numerical aperture limiter for an optical thermal imaging system, comprising at least one group of three wedge-like prisms made of a transparent material having a known index of refraction, the prisms of said group being disposed in close mutual proximity and in opposite orientation with the narrow ends of the first and third prisms of said group being adjacent to the wide end of the second prism, the prism surfaces facing one another of said group of prisms being spaced apart from one another by a distance at least equal to the wavelength of the light used by said imaging system, with the vertex angle of the first and third prisms of said group being $\alpha$ and the vertex angle of the second prism of said group being $2\alpha$, with $\alpha$ being a function of the desired numerical aperture and said index of refraction.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

Figure 1:
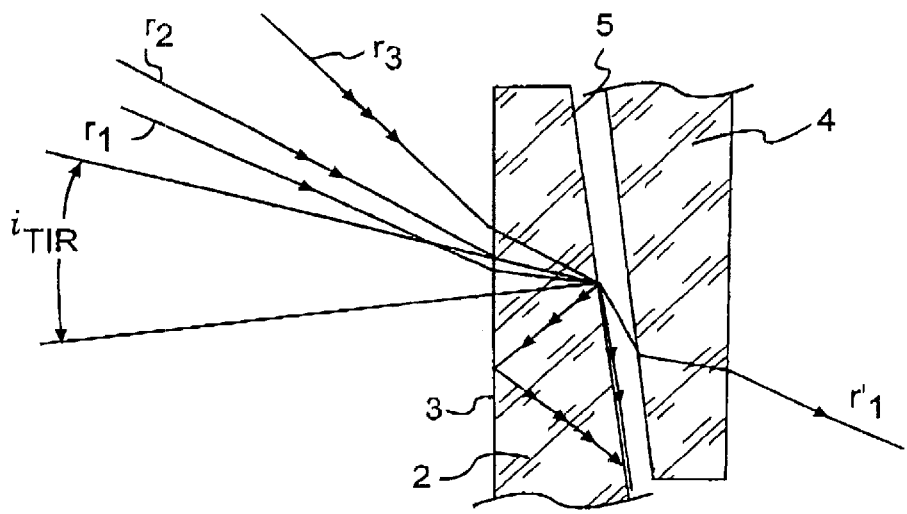
Figure 2:
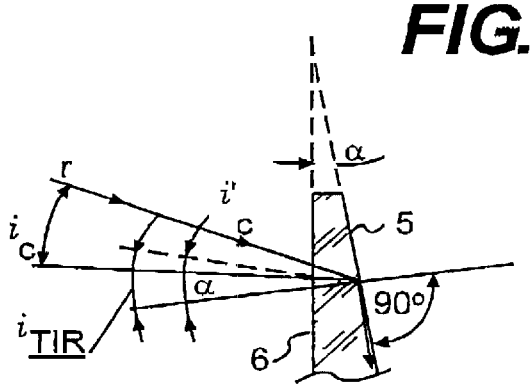
Figure 3:
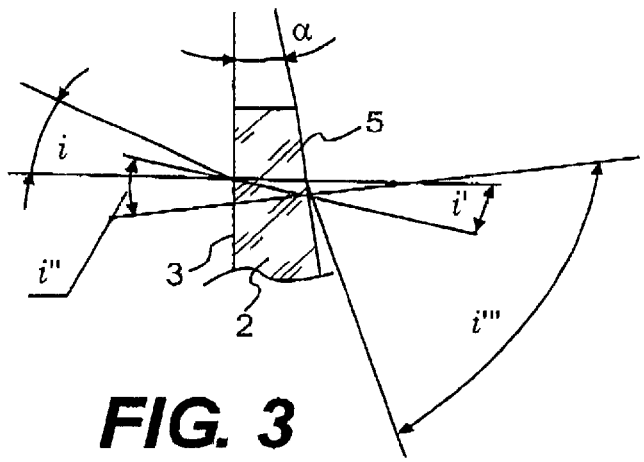
Figure 4:
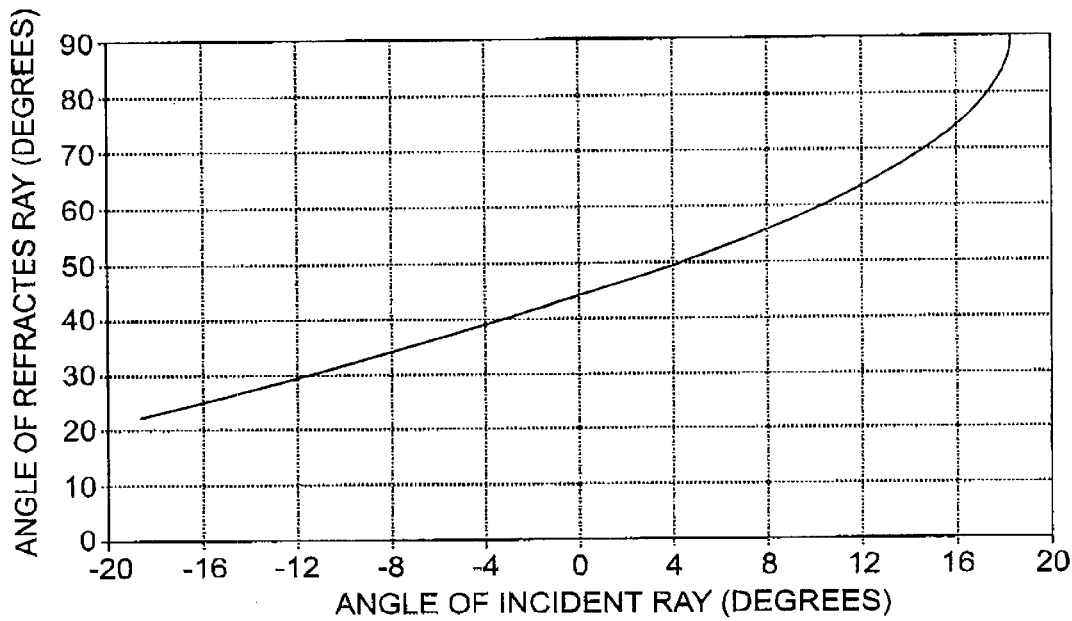
Figure 5:
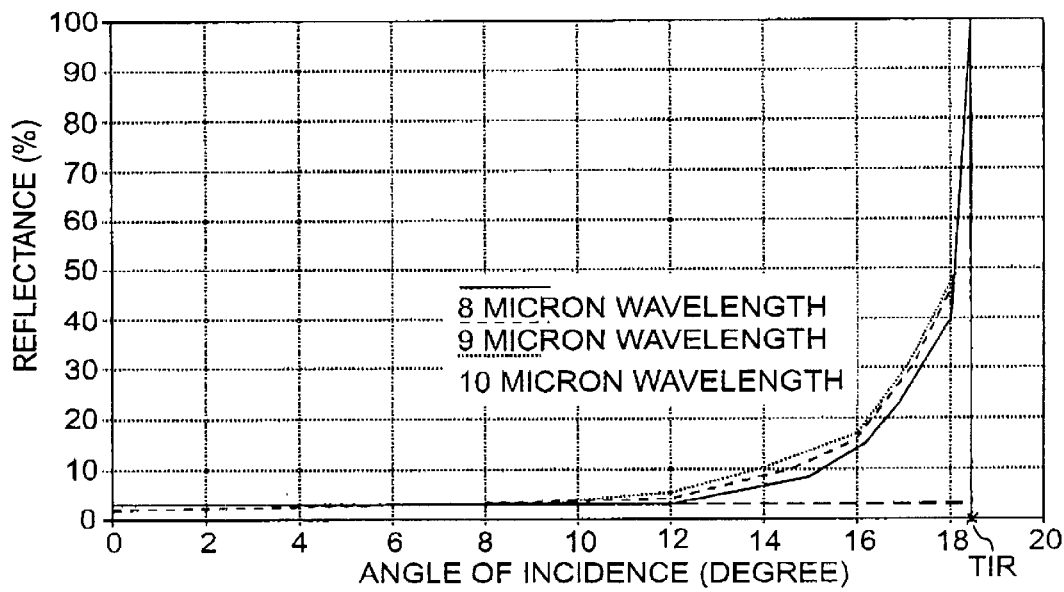
Figure 6:
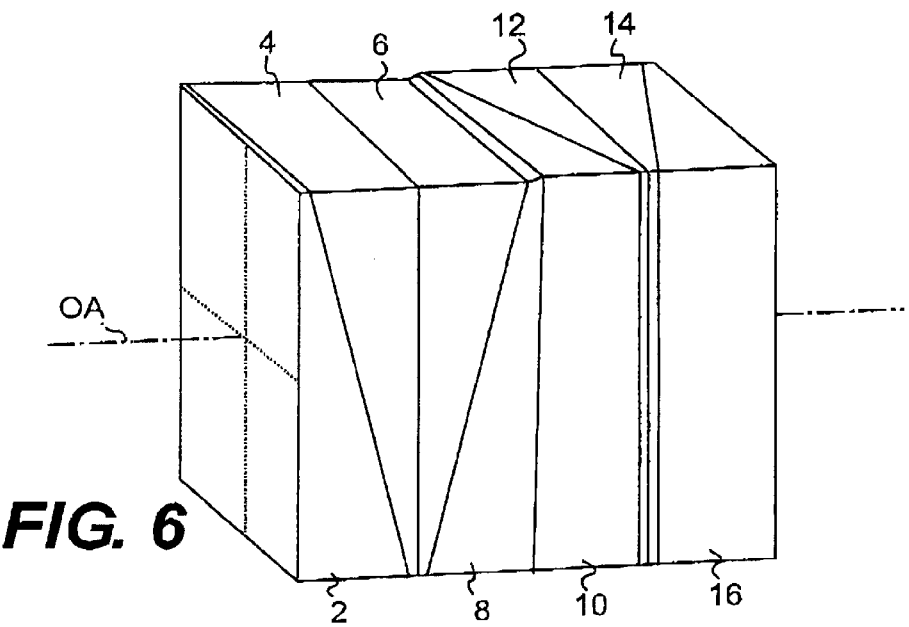
Figure 7:
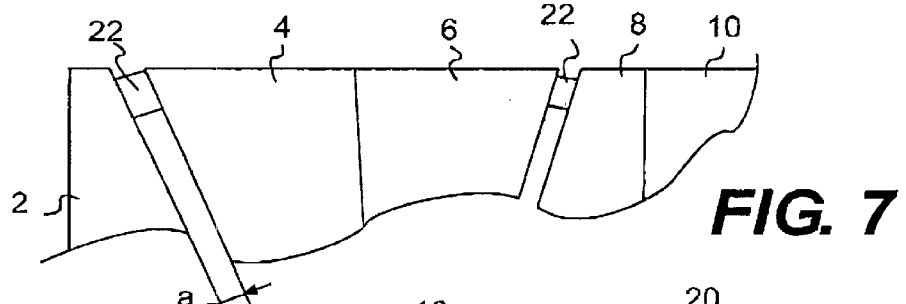
Figure 8:
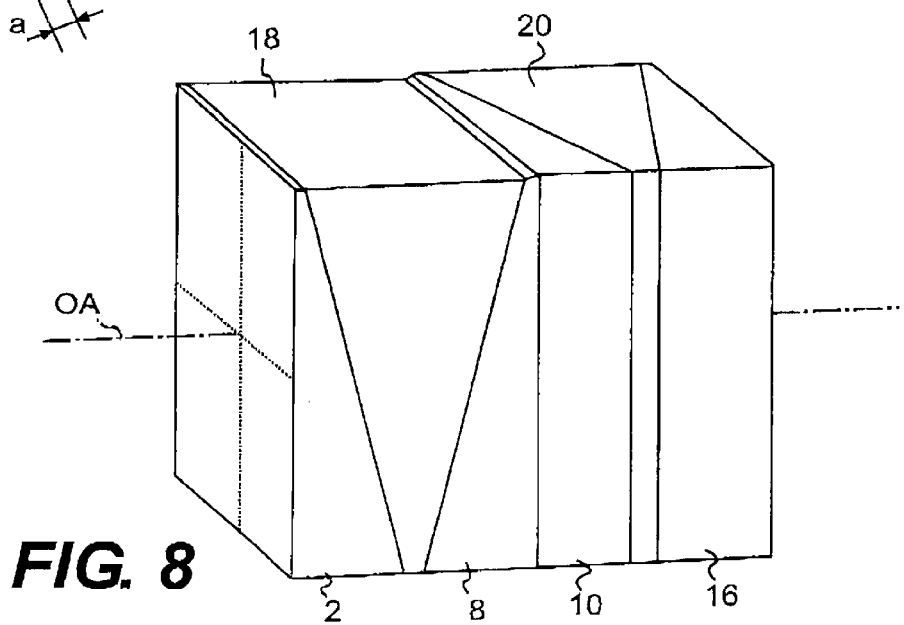
Figure 9:
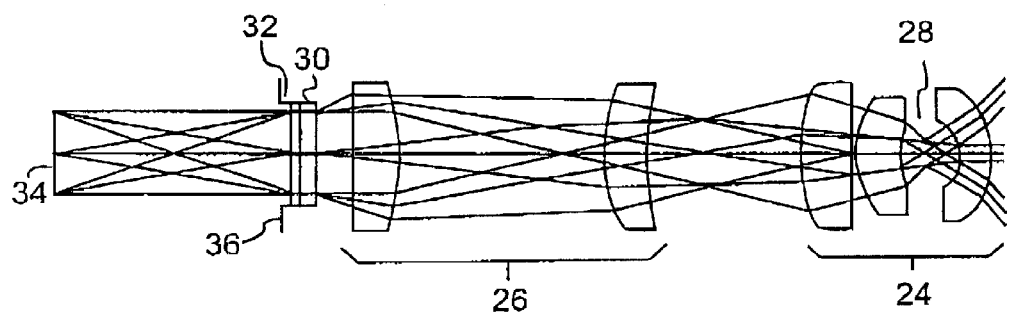
Figure 10:
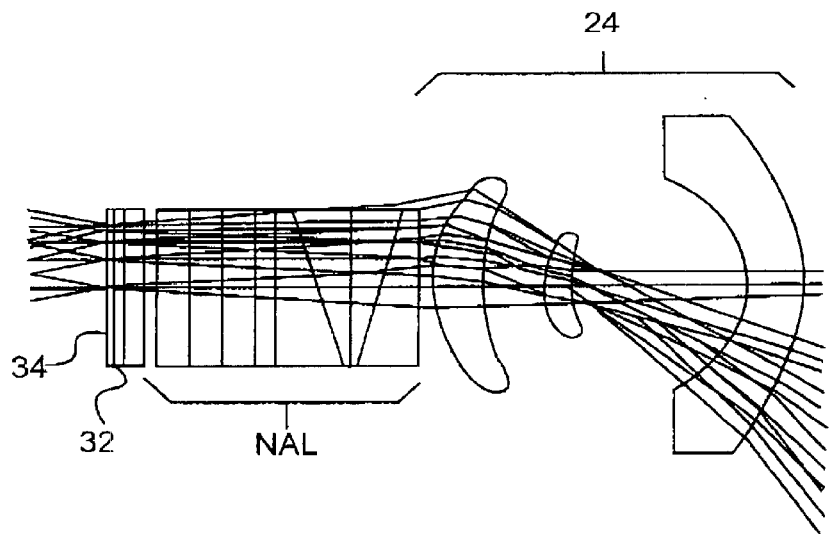

FIG. 1 schematically illustrates the passage of a single light ray through a TIR-based element of an NAL according to the present invention;

FIG. 2 shows a single NAL element for the purpose of calculation of the wedge angle as a function of the required F/# and the index of refraction of the wedge material;

FIG. 3 illustrates a single NAL element for the purpose of calculation of the angle of a refracted light ray as a function of the angle of incidence of that ray, the wedge angle of the NAL element, and its index of refraction;

FIG. 4 is a graph indicating the dependence between the angles of incidence and refracted rays for a single NAL element having a vertex angle of 9.94°, corresponding to F/# 1.5;

FIG. 5 is a graph indicating reflectance on passage through a single NAL element as a function of the angle of incidence relative to the first surface of a wedge, for three different wavelengths;

FIG. 6 is a perspective view of an NAL to be used in conjunction with a two-dimensional detector, comprised of eight identical wedges;

FIG. 7 is an enlarged, elevational view of a fragment of the NAL of FIG. 6;

FIG. 8 is a perspective view of a second embodiment of an NAL according to the invention;

FIG. 9 is a schematic representation of a prior-art thermal imaging system having a two-dimensional detector and operating according to the cold shield concept, and FIG. 10 schematically represents the system of FIG. 9 with an NAL according to the present invention.

DETAILED DESCRIPTION

Referring now to the drawings, there is seen in FIG. 1 a first embodiment of the NAL according to the present invention, consisting of a basic unit having a pair of wedge-shaped prisms 2, 4 in opposite orientation, which are component parts of the complete NAL as shown in FIG. 6. For clarity, prisms 2, 4 are shown widely spaced apart, although in reality the components of the basic units of the NAL are far closer to one another, as seen in FIG. 7. In fact, as will be explained below with regard to FIG. 7, the components are separated by an air gap of about 0.02 mm only.

Seen in FIG. 1 is the limit angle of total internal reflection $i_{TIR}$, which is also the angle that defines the numerical aperture (NA) or acceptance angle of the system. Beyond the limit angle $i_{TIR}$, total internal reflection takes place, preventing the passage of light rays. Thus, ray $r_1$, the angle of incidence of which can be seen on the second surface 5 of prism 2 to be smaller than $i_{TIR}$, passes prism 2 and leaves prism 4 as $r'_1$ in a direction parallel to $r_1$. Ray $r_2$, the angle of incidence of which coincides, on surface 5 of prism 2, with the upper limb of $i_{TIR}$, is reflected into surface 5 and fails to pass prism 2, while ray $r_3$, with a much larger angle of incidence, undergoes total reflection and is eventually reflected out of prism 2.

It will be appreciated that prisms 2, 4, constituting one basic unit of the NAL, can handle only rays having a positive slope, i.e., rays that first strike surface 3 of prism 2 from points above the optical axis OA of the system (see FIG. 6). Rays with a negative slope, i.e., rays that strike surface 3 from points below axis OA, cannot be handled by the basic unit consisting of prisms 2, 4, but require the provision of a second basic unit comprised of prisms 6, 8 (FIG. 6), optically coupled to the first basic unit in mirror-symmetrical orientation. Such an arrangement would suffice for use with a linear, one-dimensional array of detectors. For a two-dimensional array of detectors, however, two additional basic units are required, as shown in FIG. 6 and as explained further below.

FIG. 2 shows a single NAL element for the purpose of calculation of the vertex angle ax of the wedge, as a function of the required F/# and NA, and the index of refraction of the wedge material. Shown is a ray r, incident on first surface 3 at the critical angle $i'_C$, which strikes second surface 5 after refraction at the limit angle of total internal reflection $i_{TIR}$.

If $i'_C$ is the angle of the refracted ray r relative to first surface 3, then $i_{TIR}$ is seen in FIG. 2 to be $i'_C+\alpha$, where $\alpha$ is the vertex angle of the wedge:

$$i_{TIR}=i'_C+\alpha$$

thus, $\alpha=i_{TIR}-i'_C$ $i_{TIR}$ for the internal ray incident on surface 5 can be calculated using Snell's Law, assuming the refracted ray to be parallel to the boundary surface of the medium, in other words, parallel to surface 5. In other words, assuming the angle of refraction to be 90°:

$$\sin 90°/\sin i_{TIR}=n$$

n being the index of refraction of the wedge material. Hence, $$\sin i_{TIR}=1/n, \text{ and}$$

$$i_{TIR}=\arcsin(1/n)$$

The angle of refraction $i'_C$ on the first surface 3 is equally calculated using Snell's Law:

$$i'_C=\arcsin(\sin i'_C/n)$$

Finally, $$\alpha=i_{TIR}-i'_C=\arcsin(1/n)-\arcsin(\sin i'_C/n) \qquad (1).$$

The following table lists the vertex angles $\alpha$ of wedges made of germanium, using equation (1) above, in which $n=n_{GE}=4.0035$, for different F/#s and the corresponding numerical apertures NA and critical angles $i'_C$:

| F/# | 1.2 | 1.5 | 2.0 | 2.5 | 3.0 | 4.0 |
|---|---|---|---|---|---|---|
| NA | 0.385 | 0.316 | 0.243 | 0.196 | 0.164 | 0.124 |
| $i'_C$ | 22.62° | 18.43° | 14.04° | 11.31° | 9.46° | 7.13° |
| $\alpha$ | 8.98° | 9.94° | 10.99° | 11.66° | 12.11° | 12.69° |

FIG. 3 illustrates a single NAL element for the purpose of calculation of the angle of refraction i''' of a ray passing through prism 2 and having an angle of incidence smaller than the critical angle, as a function of the angle of refraction i' of a ray incident on surface 3 at an angle i, of the angle of incidence i'' of that ray on surface 5, and of the index of refraction n of the wedge material.

Given i''=i'+α, then, according to Snell's Law, the angle of refraction i''' at surface 5 is $$i'''=\arcsin(n \sin i')=\arcsin[n \sin(i'+\alpha)]=\arcsin\{n \sin[\sin(i/n+\alpha)]\}.$$

FIG. 4 is a graph indicating the relationship in a single NAL element between the angle of incidence and the angle of refraction (n=4.0035; α=9.94°). It can be seen that, relative to the angle of incidence, the change in the angle of refraction is non-linear and accelerates with increasing angles of incidence.

FIG. 5 illustrates reflectance of the first surface of an NAL element provided with an anti-reflection coating, as a function of the angle of incidence, for three different wavelengths. It can be seen that reflectance steeply increases as the point of TIR is approached. This phenomenon facilitates sharp transition from light to darkness at the NA boundary, enhancing clear definition of the NA of the system.

As mentioned above, the provision of two basic units, each comprised of two wedges, would suffice for a one-dimensional array of detectors but not for a two-dimensional detector array. For such an array, the NAL shown in FIG. 6 is provided with another two basic units, consisting of four wedge elements 10, 12, 14, 16, optically coupled to the first two basic units at the interface between prisms 8 and 10 and angularly displaced relative to the first two basic units by rotation of 90° about the optical axis OA. Wedges 10, 12 handle rays associated with the left half of the horizontal median plane; wedges 14, 16 deal with rays associated with the right half of that plane.

It should be noted that in FIG. 6, the NAL is shown highly foreshortened and the faces perpendicular to the optical axis OA are substantially square.

As mentioned above in conjunction with FIG. 1, the slanting faces of the wedges must not touch, as the TIR effect takes place only when a ray is about to pass from a medium of a higher, to a medium of a lower, index of refraction. If wedge 4 were to touch wedge 2, the TIR would be frustrated. To prevent this from happening, a medium having a lower index of refraction has to be interposed, e.g., between wedge 2 and wedge 4. Such a medium would obviously be air in a gap α defined between the two edges, as shown in FIG. 7. To be effective, the air gap must be wider than the wavelength of the light used by the thermal imaging system. In practice, a gap width of about 0.02 mm suffices. The required air gaps are produced by the use of shims 22 interposed between the relevant wedge faces. Shims 22 could either be narrow strips to be applied at opposite ends of the air gap, or narrow frames. The entire NAL is, of course, mounted and held together in a housing with appropriate openings (not shown).

FIG. 8 illustrates a second embodiment of an NAL according to the present invention, in which prisms 4 and 6, respectively 12 and 14 in FIG. 6, have been joined to form single prisms 18, 20 respectively, each having a vertex angle of 2α, as opposed to the vertex angle α of prisms 2, 8, 10 and 16. Spacing of the slanting faces of the prisms is carried out in analogy to the embodiment of FIG. 6, as explained above in conjunction with FIG. 7.

FIG. 9 schematically represents a prior art thermal imaging system having a two-dimensional detector and operating according to the cold shield concept. Shown are two optical units, an objective 24 and relay optics 26 required to re-image the cold shield in the pupil plane 28. Detector window 30 and cold filter 32 are quite remote from detector plane 34, due to the position of cold shield 36. This means that the volume to be cooled is relatively large.

FIG. 10 shows an NAL according to the present invention used in a thermal imaging system. Due to the close proximity of the detector window 30, cold filter 32 and detector plane 34, as well as the absence of relay optics 26, the system is about half as long as the prior art system, for a given detector size.

A further advantage of optical systems using an NAL resides in the fact that the optical path of the principal rays in the image space are telecentric, which permits identical spectral transmission of all rays, regardless of different fields of view.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A numerical aperture limiter for an optical thermal imaging system, comprising:

at least two pairs of wedge-like prisms, each prism being defined by surfaces and a vertex angle and made of a transparent material having a known index of refraction, the second pair of said prisms being of a mirror-symmnetrical orientation and optically coupled to the first pair of said prisms, said prisms of the pair of prisms being immovably disposed in close mutual proximity and in opposite orientation with the narrow end of one prism adjacent to the wide end of the other prism, the prism surfaces facing one another of said pair of prisms being spaced apart from one another by a distance at least equal to a wavelength of the light rays used by said imaging system, with the vertex angle of said prisms being a function of a desired numerical aperture and said index of refraction upon said light rays with directions exceeding said desired numerical aperture being reflected from the prism surfaces due to total internal reflection principle.

2. The numerical aperture limiter as claimed in claim 1, comprising two groups of said two pairs of said wedge-like prisms, the second group of said two pairs of prisms being optically coupled to the first group of said two pair of prisms and being angularly displaced relative thereto by a rotation of 90° about the optical axis of said limiter.

3. The numerical aperture limiter as claimed in claim 1, wherein spacing apart of said pair of prisms is effected by the use of shim-like spacers extending along at least two opposite edge regions of said pair of prisms.

* * * * *